US009584952B2

(12) United States Patent
Jin et al.

(10) Patent No.: US 9,584,952 B2
(45) Date of Patent: Feb. 28, 2017

(54) DATA COLLECTION IN WIRELESS SENSOR NETWORK

(71) Applicant: HUA ZHONG UNIVERSITY OF SCIENCE TECHNOLOGY, Wuhan, Hubei (CN)

(72) Inventors: Hai Jin, Hubei (CN); Chen Yu, Hubei (CN); Xi Li, Hubei (CN); Chuanming Liang, Hubei (CN)

(73) Assignee: HUA ZHONG UNIVERSITY OF SCIENCE TECHNOLOGY, Wuhan, Hubei (CN)

( * ) Notice: Subject to any disclaimer, the term of this patent is extended or adjusted under 35 U.S.C. 154(b) by 0 days.

(21) Appl. No.: 14/441,320

(22) PCT Filed: Jul. 9, 2013

(86) PCT No.: PCT/CN2013/079045
§ 371 (c)(1),
(2) Date: May 7, 2015

(87) PCT Pub. No.: WO2015/003315
PCT Pub. Date: Jan. 15, 2015

(65) Prior Publication Data
US 2015/0341739 A1 Nov. 26, 2015

(51) Int. Cl.
*H04W 84/18* (2009.01)
*H04W 4/00* (2009.01)
(Continued)

(52) U.S. Cl.
CPC ............. *H04W 4/005* (2013.01); *H04L 43/16* (2013.01); *H04W 40/32* (2013.01);
(Continued)

(58) Field of Classification Search
None
See application file for complete search history.

(56) References Cited

U.S. PATENT DOCUMENTS 7,738,413 B2   6/2010  Varaiya et al.
8,279,810 B1 * 10/2012  Li ..................... H04W 4/006
                                             370/328

(Continued)

FOREIGN PATENT DOCUMENTS

CN    101394321 B   12/2010
CN    102438291 A    5/2012
CN    102572996 A    7/2012

OTHER PUBLICATIONS

Akyildiz, I.F., et al. "Wireless Sensor Networks: a survey," Computer networks, vol. 38, No. 4, Mar. 2002, pp. 393-422.
(Continued)

*Primary Examiner* — Duc Duong
(74) *Attorney, Agent, or Firm* — Brundidge & Stanger, P.C.

(57) ABSTRACT

In one example, a method may include configuring sensors to respectively collect information, into groups of sensors based on relative distances of the sensors to other sensors; configuring sensors in a first group of sensors within a threshold distance from a receiver to transmit the respectively collected information directly to the receiver; configuring sensors in a second group of sensors within the threshold distance to receive information from at least one sensor in a third group of sensors that is located further away from the receiver than the second group of sensors; cumulatively transmit respectively collected information and the received further information directly to the receiver; configuring sensors in the third group of sensors not within the threshold distance to transmit respectively collected information to a closest one of the sensors in the second group of sensors; and updating the threshold distance after a set duration of time.

20 Claims, 6 Drawing Sheets

(51) Int. Cl.
  *H04W 72/04* (2009.01)
  *H04L 12/26* (2006.01)
  *H04W 40/32* (2009.01)
  *H04W 40/10* (2009.01)

(52) U.S. Cl.
  CPC ........ *H04W 72/0473* (2013.01); *H04W 40/10* (2013.01); *H04W 84/18* (2013.01)

(56) References Cited

U.S. PATENT DOCUMENTS

| | | | | |
|---|---|---|---|---|
| 2005/0157698 | A1* | 7/2005 | Park | H04W 40/248 370/351 |
| 2008/0069008 | A1* | 3/2008 | Park | H04W 64/00 370/254 |
| 2010/0074133 | A1* | 3/2010 | Kim | G01S 5/0289 370/252 |
| 2010/0141531 | A1* | 6/2010 | Nam | G01S 5/14 342/451 |
| 2010/0169032 | A1* | 7/2010 | Zalyubovskiy | G01R 21/01 702/61 |
| 2013/0045750 | A1* | 2/2013 | Kim | G01S 5/14 455/456.1 |
| 2013/0117420 | A1* | 5/2013 | Han | H04L 45/00 709/220 |
| 2013/0322318 | A1* | 12/2013 | Das | H04W 52/0219 370/311 |
| 2014/0355499 | A1* | 12/2014 | Akhlaq | H04W 52/0203 370/311 |

OTHER PUBLICATIONS

Chen, J. and Shen, H., "MELEACH-L: More Energy-Efficient LEACH for Large-Scale WSNs," 4th International Conference on Wireless Communications, Networking and Mobile Computing, Oct. 12-14, 2008, pp. 1-4.

Efthymiou, C. et al., "Energy Balanced Data Propagation in Wireless Sensor Networks," Proc. 18th Int'l Parallel and Distributed Processing Symp., 2004.

Farooq, M. O. et al., "MR-LEACH: Multi-hop Routing with Low Energy Adaptive Clustering Hierarchy," 4th International Conference on Sensor Technologies and Applications, pp. 262-268, Jul. 2010.

Ganesan, D. et al., "Power Efficient Sensor Placement and Transmission Structure for Data Gathering under Distortion Constraints," ACM Trans. Sensor Networks, vol. 2, No. 2, pp. 155-181, May 2006.

Heinzelman, W. B. et al., "An Application-Specific Protocol Architecture for Wireless Microsensor Networks," IEEE Transaction on Wireless Communications, vol. 1, No. 4, pp. 660-670, (Oct. 2002).

Jarry, A. et al., "An Optimal Data Propagation Algorithm for Maximizing the Lifespan of Sensor Networks," Second IEEE International Conference, DCOSS 2006, pp. 405-421.

Lindsey, S. and Raghavendra, C. S., "PEGASIS: Power-efficient gathering in sensor information systems," IEEE Aerospace Conference Proceedings, vol. 3, pp. 3-1125-3-1130, (2002).

Mhatre, V. and Rosenberg, C., "Design guidelines for wireless sensor networks: communication, clustering and aggregation," Received Jun. 15, 2003; accepted Jul. 15, 2003 Ad Hoc Networks 2 (2004), pp. 45-63.

Raghunathan, V. et al., "Energy-aware Wireless Microsensor Networks," IEEE Signal Processing Magazine, Mar. 2002, pp. 40-50.

Tong, M. and Tang, M., "LEACH-B: An Improved LEACH Protocol for Wireless Sensor Network," Wireless Communications Networking and Mobile Computing, Sep. 23-25, 2010, pp. 1-4.

Wang, Q. et al., "On Lifetime-Oriented Device Provisioning in Heterogeneous Wireless Sensor Networks," IEEE Network, vol. 20, No. 3, pp. 26-33, May/Jun. 2006.

Xu, K. et al., "Relay Node Deployment Strategies in Heterogeneous Wireless Sensor Networks," IEEE transactions on Moblie Computing, vol. 9, No. 2, Feb. 2010, pp. 145-159.

Zhang, H. and Shen, H., "Balancing Energy Consumption to Maximize Network Lifetime in Data-Gathering Sensor Networks," IEEE transactions on Parallel and Distributed system, vol. 20, No. 10, Oct. 2009.

Zhang, J. et al., "Distributed Singlehop-multihop Switch (DSMS) Routing Protocol for wireless sensor networks," International Conference on Information Engeering and Computer Science, Dec. 2009.

International Search Report and Written Opinion from International Application No. PCT/CN13/79045 mailed Apr. 16, 2014.

\* cited by examiner

DATA COLLECTION IN WIRELESS SENSOR NETWORK

CROSS-REFERENCE TO RELATED APPLICATION

This Application is the U.S. National Stage filing under 35 U.S.C. §371 of PCT Application Ser. No. PCT/CN13/79045 filed on Jul. 9, 2013. The disclosure of the PCT Application is hereby incorporated herein by reference in its entirety.

TECHNICAL FIELD

The embodiments described herein pertain generally to data collection in a wireless network based on a progressive distributive single-hop mode.

BACKGROUND

Unless otherwise indicated herein, the approaches described in this section are not prior art to the claims in this application and are not admitted to be prior art by inclusion in this section.

Wireless sensor networks include sensor nodes having a plurality of sensors and a receiver. The sensors are typically linked by a wireless medium to perform distributed sensing operations. The wireless sensor network applications require energy efficiency. As energy consumption in a wireless sensor network may be a problem, wireless sensor networks are typically formed in low power consumption clusters, where a cluster head node is typically selected at a remote end of the wireless sensor network. Since there is a difference between a distance from the cluster head node to a base station and other clusters to the base station, energy consumption of the clusters is unbalanced. Alternatively, data collection may be performed based on node-distributed control. In either case, performance of a network-clock synchronization operation may be necessary.

SUMMARY

Technologies are generally described for data collection in a wireless network based on a progressive distributive single-hop mode. The various techniques may be implemented in various systems, methods, and/or computer-readable mediums.

In one example embodiment, a method is provided that may comprise configuring sensors, each of which is configured to respectively collect information, into groups of sensors based on relative distances of each of the sensors to the other sensors; configuring each of the sensors in a first group of sensors that is within a threshold distance from the receiver to transmit the respectively collected information directly to the receiver; configuring each of the sensors in a second group of sensors that is within the threshold distance from the receiver to receive further information from at least one sensor in a third group of sensors that is located further away from the receiver than the second group of sensors, and to cumulatively transmit respectively collected information and the respectively received further information directly to the receiver; configuring each of the sensors in the third group of sensors that is not within the threshold distance from the receiver to transmit respectively collected information to a closest one of the sensors in the second group of sensors, and updating the threshold distance after a set duration of time.

In another example embodiment, a system is provided that may comprise a receiver, and sensors that are configured to respectively collect information, wherein the sensors are configured into groups of sensors based on relative distances of each of the sensors to the other sensors, wherein each of the sensors in a first group of sensors within a threshold distance from the receiver is configured to transmit the respectively collected information directly to the receiver, and wherein at least one of the sensors in a second group of sensors that is within the threshold distance from the receiver is configured to transmit respectively collected information directly to the receiver and to receive further information from at least one sensor in a third group of sensors that is located farther from the receiver than the second group of sensors, and wherein each of the sensors in the third group of sensors is within the threshold distance and is configured to cumulatively transmit the respectively collected information and the received further information to the receiver; and wherein the threshold distance is updated after a set duration of time.

In yet another example embodiment, a computer-readable medium is provided storing instructions that, when executed, may cause one or more processors to perform operations that may comprise calculating a threshold distance to establish a first network ring around a receiver, wherein a first group of sensors that are configured to collect data is located inside the first network ring; establishing a second network ring, having a radius of at least the threshold distance, around the first network ring, wherein a second group of sensors that are configured to collect data is located inside the second network ring; establishing a third network ring, having a radius of at least the threshold distance, around the second network ring, wherein a third group of sensors that are configured to collect data is located inside the third network ring; receiving data collected by each of the sensors of the first group of sensors directly therefrom; receiving data collected by each of the sensors of the second group of sensors directly therefrom; and receiving data collected by each of the sensors of the third group of sensors via one of the sensors of the second group of sensors that is closest to each of the respective sensors of the third group of sensors.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
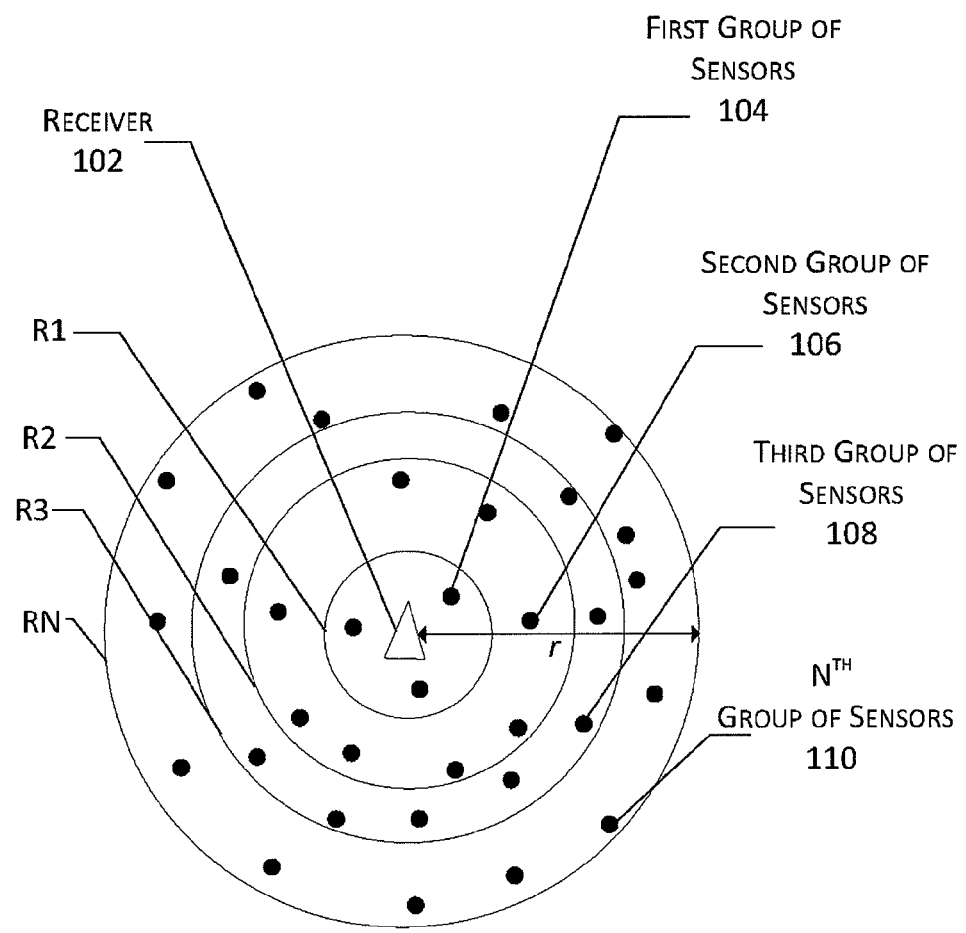
FIG. 1 shows an example wireless sensor network system configuration in which data collection may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example wireless sensor network system configuration 100 in which data collection may be implemented, arranged in accordance with at least some embodiments described herein. As depicted, configuration 100 may be a network cluster having a ring, i.e., circular, topology that includes, at least one receiver 102, and a plurality of network rings R1, R2, R3, . . . , RN. Each network ring R1 through RN may include a corresponding group of sensors 104 through 110. For example, a first network ring R1 may include a first group of sensors 104, a second network ring R2 may include a second group of sensors 106, a third network ring R3 may include a third group of sensors 108, and an $N^{th}$ network ring RN may include an $N^{th}$ group of sensors 110.

As referenced herein, "ring" may refer to a group of sensors that may be communicatively coupled to each other such that, collectively, they surround at least one embodiment of receiver 102 in a circular or spherical manner.

Further, as referenced herein, "cluster" may refer to a group of sensors that may be communicatively coupled to each other. According to some embodiments, wireless sensor network system may be of a configuration including multiple network clusters that may be communicatively coupled to each other and that may be configured to implement data collection as set forth herein.

Receiver 102 may refer to a sink node or base station that may be configured, designed and/or programmed to transmit data to, and receive data from, groups of sensors 104 through 110, via a communication link. Thus, receiver 102 may be further configured to be communicatively coupled to a wireless network via, e.g., radio frequency-based communication, for example.

Receiver 102 may include a transceiver configured to transmit signals to and receive signals from first through $N^{th}$ groups of sensors 104 through 110. Although a single receiver 102 may be provided as shown in FIG. 1, more than one receiver 102 may be included in the wireless sensor network system and be communicatively coupled to first through $N^{th}$ groups of sensors 104 through 110.

Each network ring R1 through RN may be configured or designed to have a substantially equal width, and therefore a radius r of the network cluster of wireless sensor network system 100 may be equal to the width times a total number of network rings R1 through RN.

Each of the sensors in first through $N^{th}$ groups of sensors 104 through 110 within network rings R1 through RN may refer to a sensor node that may be configured, designed and/or programmed to respectively collection information. Sensors 104 through 110 may be positioned or placed a predetermined distance apart from others of sensors 104 through 110, for example, within a physical area, e.g., such as a room or a building. The collected information may pertain to physical and environmental changes, e.g., temperature, sound or air pressure within a predetermined perimeter of the physical area. The collected information may further include detected sound waves or detected motion. In accordance with various embodiments, the information to be collected by the sensors may vary based on need and/or desire of controllers of system 100. Sensors may be configured into groups of sensors 104 through 110 based on relative distances of each of sensors to other sensors.

Each sensor of groups of sensors 104 through 110 may include one or more embodiments of sensing units 202, which may be communicatively coupled to each other. Sensors of groups of sensors 104 through 110 may include a framework of hardware, software, firmware, or any combination thereof, through or to which data may be measured, stored, passed, or transmitted to another sensor of any of the same group of sensors 104 through 110, a different group of sensors 104 through 110, or receiver 102.

According to some embodiments, each network ring R1 through RN may be established by calculating a threshold distance $d_t$ from receiver 102. According to some embodiments, threshold distance $d_t$ may be calculated based on one or more parameters, e.g., an energy consumption level of each sensor within first through $N^{th}$ groups of sensors 104 through 110, or a lifespan of one or more sensors. For example, when energy consumption level of sensors in the first group of sensors 104 reaches a threshold energy consumption level, threshold distance $d_t$ may be updated such that it includes more than one group of sensors, i.e., more than one network ring R1 through RN for performing in a single-hop mode. In one embodiment, receiver 102 may calculate the threshold distance $d_t$. In alternative embodiments, threshold distance $d_t$ may be predetermined, e.g., provided, by a user via an external computer. That is, a user may determine, via the external computer, the number of groups of sensors 104 through 110 that perform in a single-hop mode as opposed to a multi-hope mode.

As referenced herein, "single-hop mode" may refer to an implementation by which a sensor within any of the first through $N^{th}$ groups of sensors 104 through 110 transmits information directly to receiver 102.

Further, as referenced herein, "multi-hop mode" may refer to an implementation by which a sensor transmits data indirectly, via at least one other sensor in an adjacent ring that is, relatively, closer to receiver 102.

Sensors of first through $N^{th}$ groups of sensors 104 through 110 may be configured, programmed and/or designed to perform data transmission in a progressively distributed single-hop mode. According to some embodiments, in a progressively distributed single-hop mode, sensors of first through $N^{th}$ groups of sensors 104 through 110 may be configured to initially operate in a multi-hop mode, as well as to operate in a single-hop mode based on calculation of threshold distance $d_t$, group by group. Thus, a number of first through $N^{th}$ groups of sensors 104 through 110 may operate in a single-hop mode while a remaining number of first through $N^{th}$ groups of sensors 104 through 110 may continue to operate in a multi-hop mode, simultaneously. The configuration may be performed by sending instructions to a processing unit of each sensor, to control sensor to either transmit data to another sensor or to receiver 102. After a period of time as determined by a processing unit of receiver 102 based on an energy consumption level of each sensor, all sensors of first through $N^{th}$ groups of sensors 104 through 110 may operate in a single-hop mode in order to balance energy consumption levels of all of sensors of first through $N^{th}$ groups of sensors 104 through 110 in wireless sensor network system 100.

Figure 2:
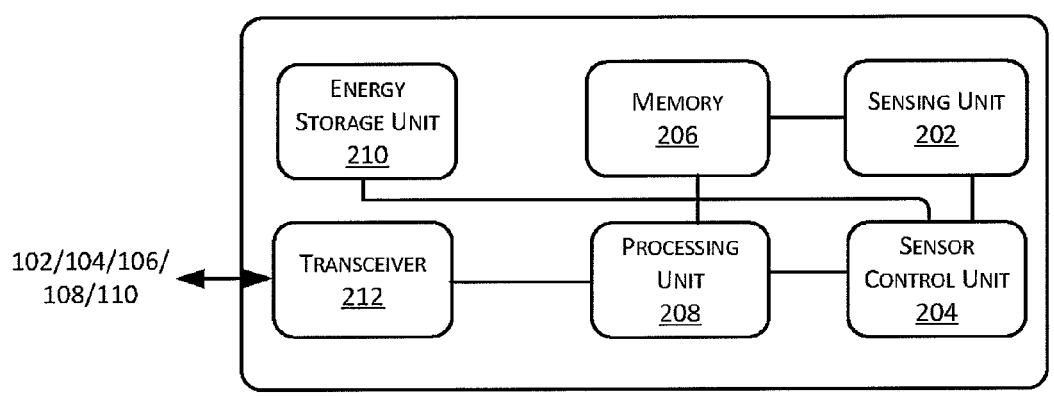
FIG. 2 shows an example configuration of a sensor of a wireless sensor network system by which data collection may be implemented, arranged in accordance with at least some embodiments described herein.

FIG. 2 shows an example configuration 200 of a sensor of a wireless sensor network system by which data collection may be implemented, arranged in accordance with at least some embodiments described herein; As depicted, example configuration 200 of each sensor of first through $N^{th}$ groups of sensors 104 through 110, includes, at least, a sensing unit 202, a sensor control unit 204, a memory 206, a processing unit 208, an energy storage unit 210 and a transceiver 212; however, this configuration is an example only, and is not intended to be limiting in any manner.

Sensing unit 202 may refer to at least one device configured to sense and measure information including, for example, environmental changes, e.g., temperature, sound or air pressure, within a predetermined perimeter of a physical area, e.g., a room, building, outdoor perimeter, etc. The sensing unit 202 may further sense and measure sound waves or motion. According to some embodiments, sensing unit 202 may include one or more devices.

Sensor control unit 204 may refer to a control mechanism that may be configured to control a sensing operation of sensing unit 202. Sensor control unit 204 may be configured, designed and/or programmed to receive instructions from receiver 102, and to control sensors of first through $N^{th}$ groups of sensors 104 through 110 respectively, to perform in either single-hop mode or multi-hop mode.

Memory 206 may refer to a storage device. Memory 206 may be configured, designed, and/or programmed to store, e.g., instructions to instruct one or more sensors to perform data collection and transmission in a single-hop mode or a multi-hop mode, or identification data of the sensor. Memory 206 may also be configured, designed, and/or programmed to store sensed data measured by each sensor of first through fourth groups of sensors 104 through 110.

Processing unit 208 may refer to a microcontroller that may be configured to perform tasks, to process data and/or to control the functionality of other components in each sensor of first through $N^{th}$ groups of sensors 104 through 110. Processing unit 208 may further be configured, designed and/or programmed to process signals received from receiver 102 and to provide instructions for data collection and transmission to sensor control unit 204 based on signals received. Processing unit 208 may be further configured, and/or programmed to receive energy consumption information corresponding to each sensor in order to determine whether each sensor has reached a threshold energy consumption level.

Energy storage unit 210 may refer to an accumulator that may be configured to store energy to be used by each sensor when measuring data information.

Transceiver 212 may refer to a unit, which includes at least a receiver and a transmitter, that may be configured, designed and/or programmed to transmit and receive data to and from receiver 102 or other sensors of groups of sensors 104 through 110.

Figure 3:
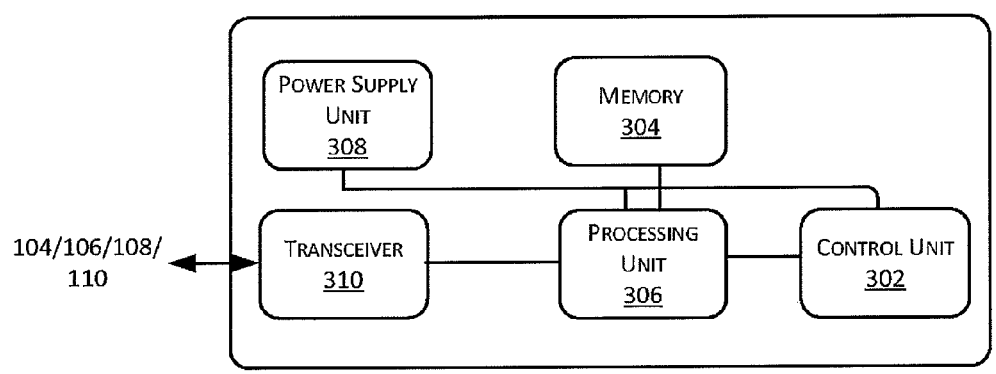
FIG. 3 shows an example configuration of a receiver of a wireless sensor network system by which data collection may be implemented, arranged in accordance with at least some embodiments described herein.

FIG. 3 shows an example configuration 300 of a receiver of a wireless sensor network system by which data collection may be implemented, arranged in accordance with at least some embodiments described herein. As depicted, example configuration 300 of a receiver may include, at least, a control unit 302, a memory 304, a processing unit 306, a power supply unit 308, and a transceiver 310; however, this configuration is an example only, and is not intended to be limiting in any manner.

Control unit 302 may refer to a controller that may be configured, designed and/or programmed to control operation of receiver 300. Control unit 302 may be configured to control receiver 300 based on instructions from processing unit 306, to determine when to transmit signals to and to receive signals from sensors of first through $N^{th}$ groups of sensors 104 through 110. According to alternative embodiments, receiver 30 may be controlled by an external control unit in communication with control unit 302 and providing instructions thereto for controlling receiver 300.

Memory 304 may refer to a storage database that may be configured or designed to receive and collect data transmitted from each sensor of first through $N^{th}$ groups of sensors 104 through 110.

Processing unit 306 may refer to a microcontroller that may be configured, designed and/or programmed to receive and process data transmitted from each sensor of first through $N^{th}$ groups of sensors 104 through 110 and to provide instructions to control unit 202 to control operation of receiver 300. Processing unit 306 may thus be configured, designed and/or programmed to receive, e.g., energy consumption level information generated from energy storage unit 210 of each sensor and to calculate an initial threshold distance $d_t$ based on a predetermined threshold energy consumption level of each sensor, and to recalculate, i.e., update, threshold distance $d_t$ when necessary, based on whether respective group(s) of sensors 104 through 110 have reached the predetermined threshold energy consumption level. When the predetermined threshold energy consumption level has been reached and threshold distance $d_t$, may be recalculated, receiver 300 may transmit instructions to a respective group of sensors to be configured from multi-hop mode to single-hop mode.

Power supply unit 308 may be configured to supply power to receiver 300. According to some embodiments, receiver 300 is continuously supplied with power from power supply unit 308. Thus, FIG. 3 shows an example configuration 300 of a receiver by which one or more embodiments of data collection may be implemented.

Figure 4:
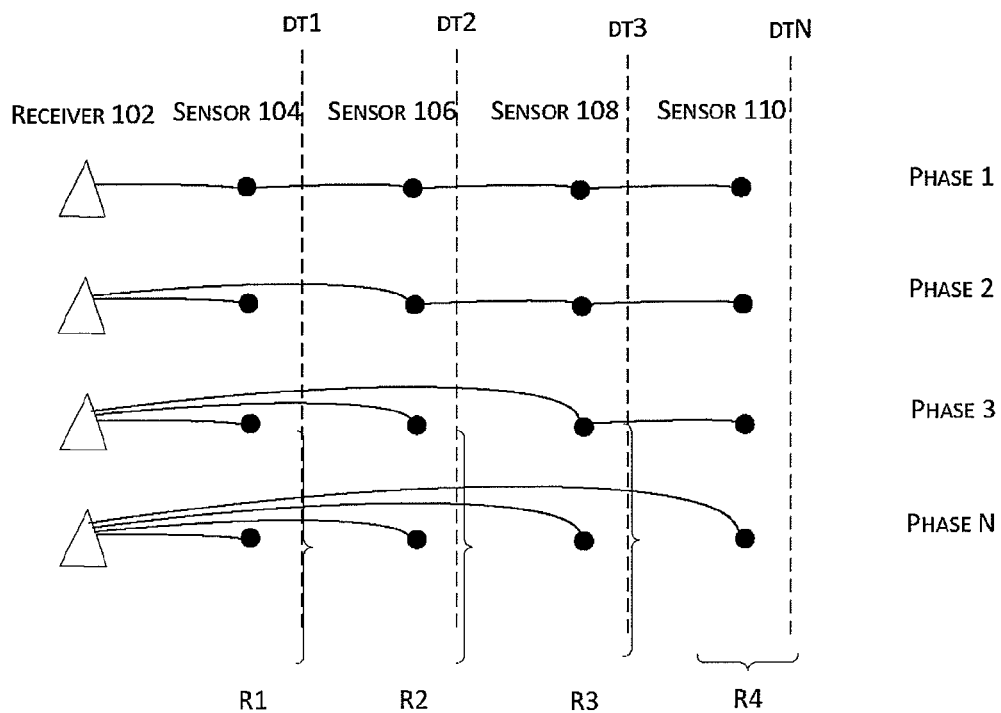
FIG. 4 shows an example configuration of progressive distributive single-hop mode of sensors of a wireless network system, arranged in accordance with at least some embodiments described herein.

FIG. 4 shows an example configuration 400 of progressive distributive single-hop mode of sensors of a wireless network system, arranged in accordance with at least some embodiments described herein. As depicted in FIG. 4, an example embodiment of various phases Phase 1 through Phase N, for performing data transmission between receiver 102 and respective sensors for first through $N^{th}$ groups of sensors 104 through 110 is provided; however, this configuration is an example only, and is not intended to be limiting in any manner. In at least some embodiments, a number of sensors may operate in a single-hop mode while a remaining number of sensors may operate in a multi-hop mode. As depicted, each group of sensors 104 through 110 performs data transmission by either single-hop mode or multi-hop mode, to receiver 102. For example, first group of sensors 104 may perform data transmission in single-hop mode while second group of sensors 106 may perform data transmission in multi-hop mode. In another example, first and second groups of sensors 104 may perform data transmission in single-hop mode while third and fourth groups of sensors 108 and 110 may perform data transmission in multi-hop mode. Thus, one or more group of the groups of sensors 104 through 110 may perform data transmission by single-hop mode while other groups of the groups of sensors 104 through 110 may perform data transmission by multi-hop mode.

As referenced herein, "phase" may refer to a time period in which a sensor performs in a single-hop mode or a multi-hop mode. The set duration of time of Phase 1 through Phase N may be referred to as $t_1$ through $t_N$, respectively.

In Phase 1, one or more of groups of sensors 104 through 110 may operate in a multi-hop mode, wherein groups of sensors 106 through 110 may be configured to transmit respective sensed data to groups of sensors 104 through 110 in an adjacent network ring R1 through RN. For example, group of sensors 110 may be configured to transmit sensed data to group of sensors 108, and group of sensors 108 may be configured to transmit sensed data to sensor 106; group of sensors 106 may be configured to transmit data received from groups of sensors 108 and 110, along with its respectively sensed data, to group of sensors 104; group of sensors 104 may be configured to transmit all or some of the data received to receiver 102. As shown, first network ring R1 is included within a threshold distance $d_{t1}$ of receiver 102 during Phase 1, and therefore each sensor in first group of sensors 104 is within threshold distance $d_{t1}$ to receiver 102 to transmit the respectively collected information directly to receiver 102 during this phase.

According to some embodiments, groups of sensors 104 through 110 may be configured after threshold distance $d_t$ has been updated. The set duration of time may be calculated before updating each threshold distance $d_t$. Threshold distance $d_t$ may be determined based on at least a number, i.e., quantity, of groups of sensors 104 through 110. During Phases 1 through N, threshold distance $d_t$ may be repeatedly or periodically recalculated, and therefore adjusted such that sensors in first through $N^{th}$ groups of sensors 104 through 110 may be configured to operate in single-hop mode instead of multi-hop mode subsequently from one phase to a next phase, so as to balance energy consumption of all groups of sensors 104 through 110 in wireless network system 100.

According to some embodiments, at the end of the set duration of time $t_1$, receiver 102 may determine, via processing unit 306, an energy consumption level of sensors of first group of sensors 104 to determine when to proceed to Phase 2, to thereby maintain a balance of energy consumption amongst all sensors in wireless network system 100. According to other example embodiments, duration $t_1$ may be preset by a user via an external computer, based on historical or statistical data.

During Phase 2, threshold distance $d_{t2}$ may be recalculated, i.e., adjusted, by receiver 102 to include second network ring R2, therefore, second group of sensors 106 may operate in single-hop mode along with first group of sensors 104, while remaining groups of sensors 108 and 110 may be configured to continue to operate in multi-hop mode. That is, each sensor of first group of sensors 104 may be within the threshold distance $d_{t2}$ to receiver 102, and further may be configured to transmit the respectively collected information directly to receiver 102. In addition, each sensor in second group of sensors 106 may also be within threshold distance $d_{t2}$ to receiver 102, and may further be configured to receive further information from at least one sensor in third group of sensors 108 that may be located further away from receiver 102 than second group of sensors 104, and to cumulatively transmit respectively collected information and the respectively received further information directly to receiver 102. Further, each sensor in third group of sensors 110 may be configured to transmit respectively collected information to a closest one of sensors in second group of sensors 108. According to an embodiment, Phase 2 may also be performed for a set duration of time referred to as $t_2$.

During Phase 2, second group of sensors 106 may have a maximum energy consumption rate and a longer data transmission distance than first group of sensors 104 because the sensors in group of sensors 106 may transmit more data than other sensors of groups of sensors 104.

After the set duration of time $t_1+t_2$ has elapsed, receiver 102 may update threshold distance $d_{t2}$ to threshold distance $d_{t3}$, and receiver 102 may perform Phase 3. Receiver 102 may recalculate the threshold distance do based on energy consumption level information received from sensors of first and second groups of sensors 104 and 106. In Phase 3, threshold distance do may include third network ring R3, therefore sensors of third group of sensors 108 may be configured to operate in single-hop mode along with sensors of first and second groups of sensors 104 and 106 while remaining sensors of fourth group of sensors 110 may be configured to continue to operate in multi-hop mode, simultaneously, e.g., when sensors of first and second groups of sensors 104 and 106 have reached a maximum energy consumption level. That is, in some embodiments, each sensor of third group of sensors 108 may be configured to cumulatively transmit, to receiver 102, the respectively collected information and the further information received from sensors of fourth group of sensors 110. As shown in Phase 3 of the progressively distributed single-hop mode, all of sensors of first through third groups of sensors 104 through 108 in first through third network rings R1 through R3 may operate in single-hop mode. The duration of Phase 3 may be referred to as $t_3$.

During Phase N, threshold distance $d_{tN}$ may be adjusted to include $N^{th}$ network ring RN, therefore sensors of $N^{th}$ group of sensors 110 may operate in single-hop mode along with sensors of first through third groups of sensors 104 through 108. The duration of Phase N may be referred to as $t_4$.

According to some embodiments, time durations $t_1$, $t_2$, $t_3$ and $t_4$ may be set to balance energy consumption level of all sensors in first through third network rings R1 through R3. The time durations $t_1$, $t_2$, $t_3$ and $t_4$ may be preset by processing unit 306 of receiver such that Phases 1 through N may occur automatically to extend the lifespan of each sensor.

According to some embodiments, the energy consumption rate of sensors first through fourth groups of sensors 104 through 110 may be balanced by adjusting the ratio of duration $t_1$, $t_2$, $t_3$ and $t_N$ of Phases 1 through N.

Thus, FIG. 4 shows an example configuration 400 of progressively distributed single-hop mode by which one or more embodiments of data transmission to receiver may be implemented.

Figure 5:
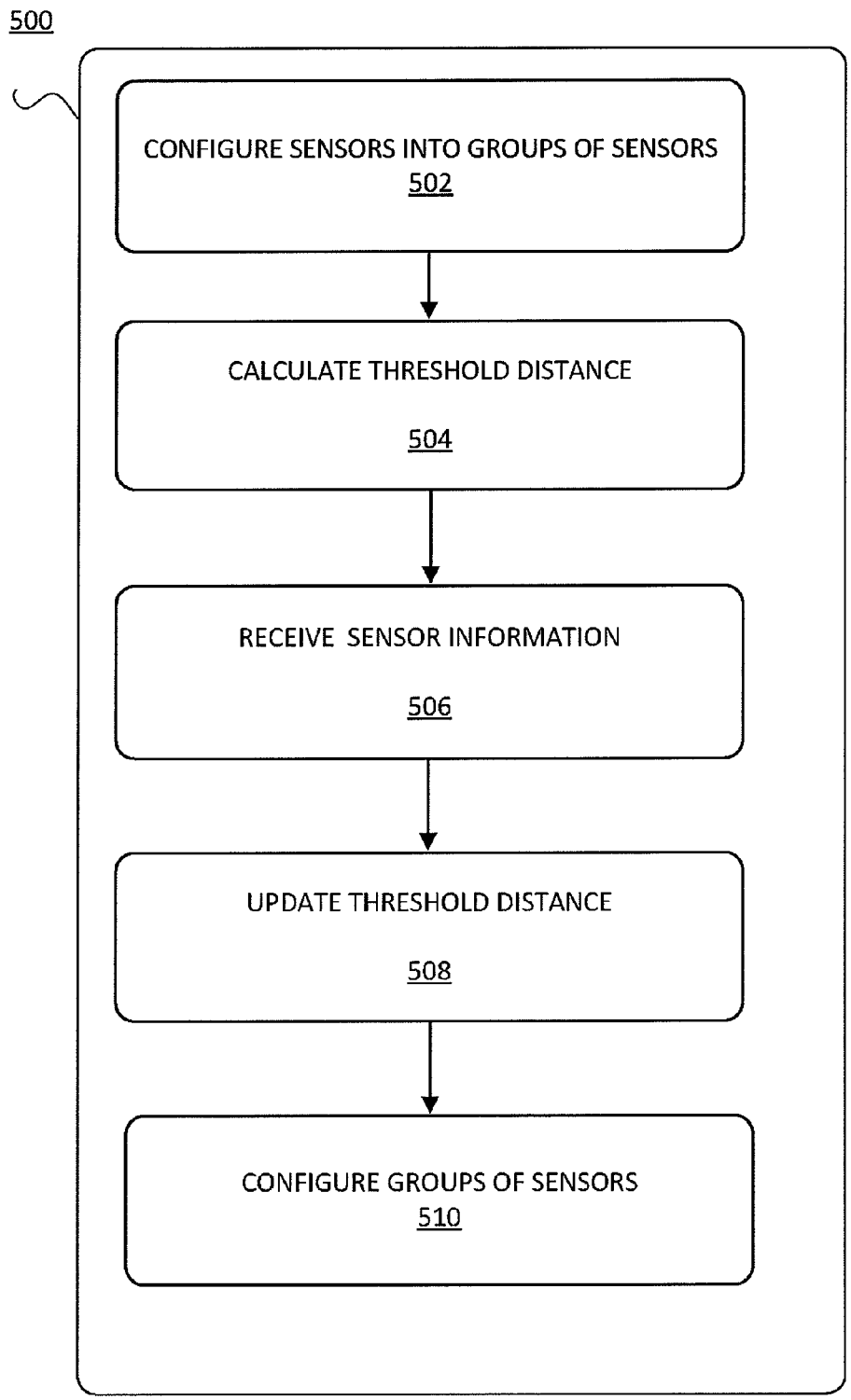
FIG. 5 shows an example configuration of a processing flow of operations for data collection implemented by a wireless sensor network system, in accordance with at least some embodiments described herein.

FIG. 5 shows an example configuration of a processing flow of operations for data collection implemented by a wireless sensor network system, in accordance with at least some embodiments described herein. As depicted, processing flow 500 includes sub-processes executed by various components that may be part of receiver 102 and sensors of first through $N^{th}$ groups 104 through 110. However, processing flow 500 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 500 may include various operations, functions, or actions as illustrated by one or more of blocks 502, 504, 506, 508 and/or 510. Processing may begin at block 502.

Block 502 (Configure Sensors) may refer to sensors being configured into groups of sensors 104 through 110 based on relative distances thereof to respectively collect information. Processing may proceed from Block 502 to Block 504.

Block 504 (Calculate Threshold Distance) may refer to receiver 102 being configured by, for example, a user to calculate a threshold distance to establish a first network ring R1, a second network ring 2 having a radius of at least the threshold distance around first network ring R1, a third network ring R3 having a radius of at least the threshold distance around second network ring R2, and an $N^{th}$ network ring RN having a radius at least the threshold distance around a preceding network ring, e.g., R3. Processing may continue from Block 504 to Block 506.

Block 506 (Receive Sensor Information) may refer to receiver 102 receiving information directly or indirectly from all sensors of first through $N^{th}$ groups of sensors 104 through 110. In accordance with at least one embodiment, each sensor in first group of sensors 104 that is within the threshold distance $d_{t2}$ to receiver 102 may transmit the respectively collected information directly to receiver 102; and each sensor in second group of sensors 106 that is also within the threshold distance $d_{t2}$ to receiver 102 may receive further information from at least one sensor in third group of sensors 108 that may be located further away from receiver 102 than second group of sensors 106 and cumulatively transmit respectively collected information and respectively received further information directly to receiver 102. Further to the example, each sensor in third group of sensors 108 that may not be within the threshold distance $d_{t2}$ to receiver 102 transmitting respectively collected information to a closest one of the sensors in second group of sensors 106. Processing may continue from Block 506 to Block 508.

Block 508 (Update Threshold Distance) may refer to receiver 102 calculating a set duration of time, e.g., time duration $t_2$ of Phase 2, and updating the threshold distance after the set duration of time has elapsed. Block 508 may also refer to receiver 102 analyzing, e.g., energy consumption information of sensors of first and second groups of sensors 104 and 106 and determining these sensors have reached a predetermined threshold energy consumption level and expanding the threshold distance based on the determination. Processing may continue from Block 508 to Block 510.

Block 510 (Configure Groups of Sensors) may refer to receiver 102 transmitting instructions to sensors of groups of sensors 104 through 110 based on the updated threshold distance, to transform from multi-hop mode to single-hop mode based on the energy consumption level of all or some of the sensors. For example, based on receiver 102 determining that sensors of first and second groups of sensors 104 and 106 have reached a predetermined threshold energy consumption level, receiver 102 may transmit instructions to sensors in third group of sensors 108 to be configured to operate in single-hop mode while sensors in fourth group of sensors 110 continue to operate in multi-hop mode. Therefore, all sensors in first through third groups of sensors 104 through 108 may operate in single-hop mode while sensors in fourth group of sensors 110 may operate in multi-hop mode.

Thus, FIG. 5 shows an example processing flow executed by receiver 102 of wireless sensor network 100.

Figure 6:
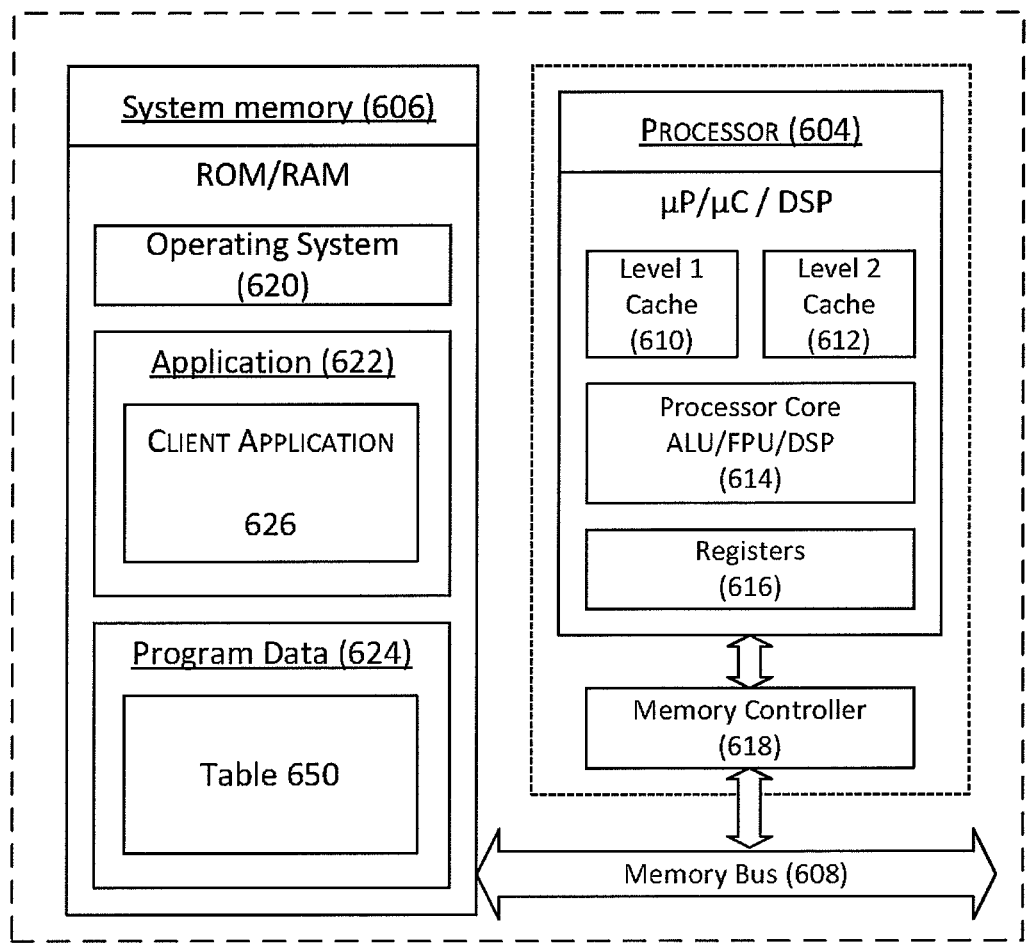
FIG. 6 shows a block diagram illustrating an example computing device by which various example solutions described herein may be implemented, arranged in accordance with at least some embodiments described herein.

FIG. 6 shows a block diagram illustrating an example computing device 600 by which various example solutions described herein may be implemented, arranged in accordance with at least some embodiments described herein.

More particularly, FIG. 6 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the configuration 100 for performing data collection via sensors in the wireless sensor network system.

In a very basic configuration, a computing device 600 may typically include one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. The processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may include client application 626 configured to transmit or receive identification information pertaining to receiver 102, and sensors of first through fourth sensor groups 104 through 110, verify or validate such identifying data, and transmit device data as described herein, for example, with respect to FIGS. 1-5. Program data 624 may include a table 650, which may be useful for implementing actuation of appropriate components or modules as described herein.

System memory 606 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method, comprising:
   configuring sensors, each of which is configured to respectively collect information, into groups of sensors based on relative distances of each of the sensors to the other sensors;
   configuring each of the sensors in a first group of sensors that is within a threshold distance from a receiver to transmit the respectively collected information directly to the receiver;
   configuring each of the sensors in a second group of sensors that is within the threshold distance from the receiver to:
      receive further information from at least one sensor in a third group of sensors that is located farther away from the receiver than the second group of sensors, and
      cumulatively transmit respectively collected information and the received further information directly to the receiver;
   configuring each of the sensors in the third group of sensors that is not within the threshold distance from the receiver to transmit respectively collected information to a closest one of the sensors in the second group of sensors; and
   updating the threshold distance after a set duration of time.

2. The method of claim 1, further comprising configuring the groups of sensors after updating the threshold distance.

3. The method of claim 1, wherein each of the groups of sensors includes at least one energy storage unit.

4. The method of claim 1, further comprising calculating the set duration of time before updating the threshold distance.

5. The method of claim 1, wherein the threshold distance is determined based on, at least, a number of the groups of sensors.

6. The method of claim 1, wherein the respectively collected information includes at least one of current air temperature, changes in temperature within a predetermined area, detected sound waves, or detected motion.

7. The method of claim 1, further comprising:
   determining, via the receiver, whether each sensor in the groups of sensors has reached a predetermined threshold energy consumption level and updating the threshold distance when it is determined.

8. A system, comprising:
   a receiver; and
   sensors that are configured to respectively collect information,
   wherein the sensors are configured into groups of sensors based on relative distances of each of the sensors to the other sensors,
   wherein each of the sensors in a first group of sensors within a threshold distance from the receiver is configured to transmit the respectively collected information directly to the receiver, and
   wherein at least one of the sensors in a second group of sensors that is within the threshold distance from the receiver is configured to receive further information from at least one sensor in a third group of sensors that is located farther from the receiver than the second group of sensors and cumulatively transmit respectively collected information and the received further information directly to the receiver, and
   wherein each of the sensors in the third group of sensors that is not within the threshold distance from the receiver, is configured to transmit respectively collected information to a closest one of the sensors in the second group of sensors;
   wherein the threshold distance is updated after a set duration of time.

9. The system of claim 8, wherein the groups of sensors are configured after the threshold distance is updated.

10. The system of claim 8, wherein the receiver is continuously supplied with power.

11. The system of claim 8, wherein each of the sensors includes at least one energy storage unit.

12. The system of claim 8, wherein the set duration of time is calculated before updating the threshold distance.

13. The system of claim 8, wherein the threshold distance is based on a quantity of the groups of sensors.

14. The system of claim 8, wherein the collected information pertains to environmental changes within a predetermined perimeter.

15. The system of claim 8, wherein the receiver is configured to determine whether each sensor in the first group of sensors and the second group of sensors has reached a predetermined threshold energy consumption level and to update the threshold distance when it is determined.

16. A non-transitory computer-readable medium storing instructions that, when executed, cause one or more processors to perform operations comprising:
   calculating a threshold distance to establish a first network ring around a receiver,
      wherein a first group of sensors that are configured to collect data is located inside the first network ring;
   establishing a second network ring, having a radius of at least the threshold distance, around the first network ring,
      wherein a second group of sensors that are configured to collect data is located inside the second network ring;
   establishing a third network ring, having a radius of at least the threshold distance, around the second network ring,
      wherein a third group of sensors that are configured to collect data is located inside the third network ring;
   receiving data collected by each of the sensors of the first group of sensors directly therefrom;
   receiving data collected by each of the sensors of the second group of sensors directly therefrom;
   receiving data collected by each of the sensors of the third group of sensors via one of the sensors of the second group of sensors that is closest to each of the respective sensors of the third group of sensors; and
   updating the threshold distance based at least in part on an energy consumption level of sensors in the first group of sensors.

17. The non-transitory computer-readable medium of claim 16, wherein each of the groups of sensors includes at least one energy storage unit.

18. The non-transitory computer-readable medium of claim 16, wherein the threshold distance is determined based on a number of the groups of sensors.

19. The non-transitory computer-readable medium of claim 16, wherein the collected data includes at least one of current air temperature, changes in temperature within a predetermined area, detected sound waves, or detected motion.

20. The non-transitory computer-readable medium of claim 16, wherein the method further comprises:
   determining, via the receiver, whether each sensor in the first group of sensors and the second group of sensors has reached a predetermined threshold energy consumption level;
   wherein the updating of the threshold distance is based at least in part on determining that each sensor in the first group of sensors and the second group of sensors has reached the predetermined threshold energy consumption level.

\* \* \* \* \*

UNITED STATES PATENT AND TRADEMARK OFFICE
CERTIFICATE OF CORRECTION

PATENT NO. : 9,584,952 B2
APPLICATION NO. : 14/441320
DATED : February 28, 2017
INVENTOR(S) : Jin et al.

It is certified that error appears in the above-identified patent and that said Letters Patent is hereby corrected as shown below:

In Column 1, Line 8, delete "§371" and insert -- § 371 --, therefor.

In Column 8, Line 23, delete "distance do" and insert -- distance $d_{t2}$ --, therefor.

In Column 8, Line 26, delete "distance do" and insert -- distance $d_{t3}$ --, therefor.

Signed and Sealed this
Twenty-third Day of May, 2017

Michelle K. Lee
*Director of the United States Patent and Trademark Office*